A. E. & A. S. HIGLEY.
WATER HEATER.
APPLICATION FILED SEPT. 8, 1908.

946,222.

Patented Jan. 11, 1910.

Inventors
Alva E. Higley
Archer S. Higley
By C. A. Snow & Co.
Attorneys

Witnesses

UNITED STATES PATENT OFFICE.

ALVA E. HIGLEY AND ARCHER S. HIGLEY, OF SALEM, WISCONSIN.

WATER-HEATER.

946,222.  Specification of Letters Patent. Patented Jan. 11, 1910.

Application filed September 8, 1908. Serial No. 452,007.

*To all whom it may concern:*

Be it known that we, ALVA E. HIGLEY and ARCHER S. HIGLEY, citizens of the United States, residing at Salem, in the county of Kenosha, State of Wisconsin, have invented a new and useful Water-Heater, of which the following is a specification.

The objects of the invention are, generally, the provision, in a merchantable form, of a device of the class above described, which shall be inexpensive to manufacture, facile in operation, and devoid of complicated parts; specifically, the provision of a heater provided in its interior with a chamber through which water, surrounding the body of the heater, is adapted to circulate freely, a removable closure for the heater and a burner adapted to raise the temperature of the contents of the chamber, being provided, the burner being so assembled with the closure that the closure cannot be removed to give access to the burner, until the latter is first rotated from beneath the chamber, and raised to a position relatively near the top of the heater, adjacent the open air, and at a point remote from any explosive mixtures, which, through a leakage in the burner, or owing to the fact that the flame thereof may have been extinguished accidentally, may have accumulated at the bottom of the device, beneath the chamber.

With these and other objects in view, as will hereinafter more fully appear, the invention consists in the novel construction and arrangement of parts hereinafter described, delineated in the accompanying drawings, and particularly pointed out in that portion of this instrument wherein patentable novelty is claimed for certain distinctive and peculiar features of the device, it being understood that, within the scope of what hereinafter thus is claimed, divers changes in the form, proportions, size and minor details of the structure may be made, without departing from the spirit or sacrificing any of the advantages of the invention.

Figure 1:
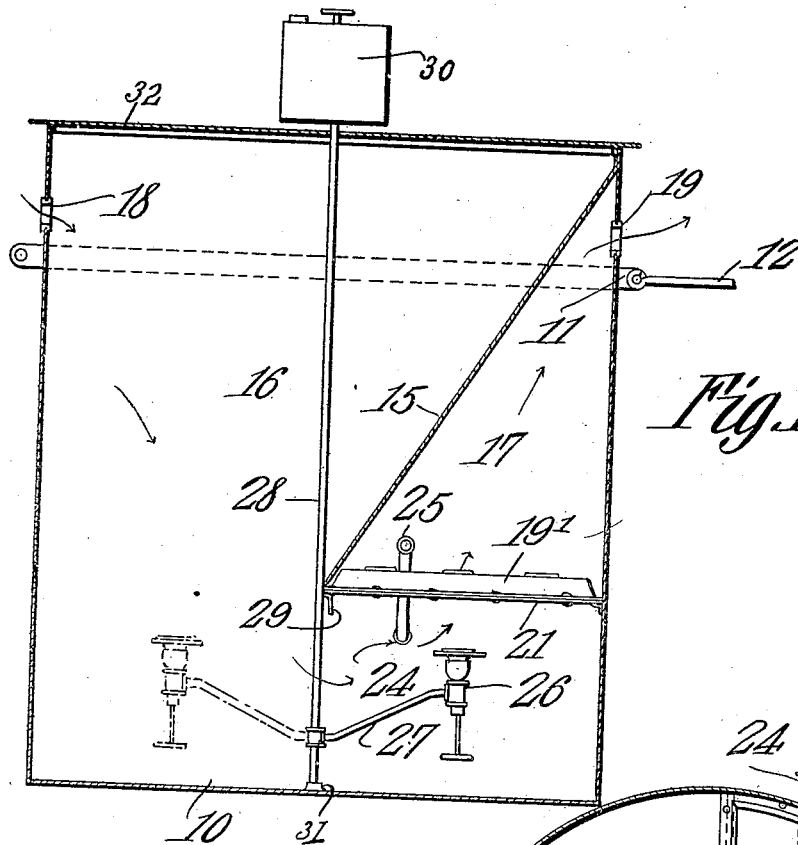
Figure 2:
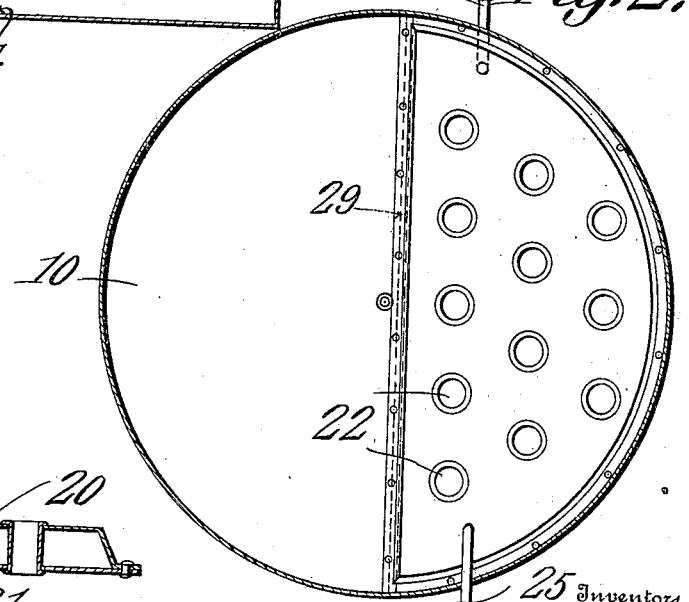
Figure 3:
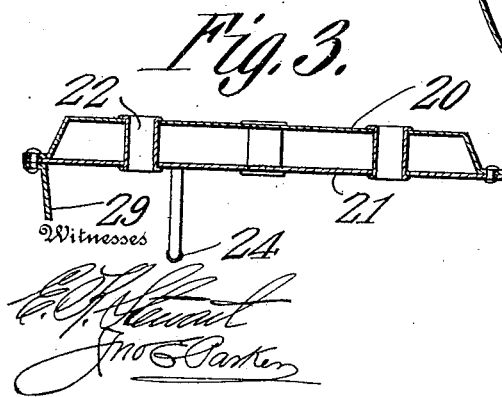

In the accompanying drawings:—Figure 1 is a sectional elevation of a water heater constructed in accordance with the invention; Fig. 2 is a sectional plan of the same; Fig. 3 is a detail sectional view of the water chamber.

Similar numerals of reference are employed to indicate corresponding parts throughout the several figures of the drawings.

The heater is provided with a suitable casing 10 that preferably, is cylindrical in form and of such height as to permit its being placed in the body of water to be heated without being wholly submerged. Preferably the casing is provided with a clamping band 11 which may carry projections 12 in order to permit the support of the heater from the sides of the tank in which it is mounted.

The interior of the casing is provided with an inclined partition 15 which divides the casing into a cold air chamber 16 and a hot air chamber 17. Air is permitted to flow into the upper portion of the cold air chamber through one or more openings 18, while the hot air escapes from the hot air chamber through one or more openings 19, all of the openings being arranged above the level of the water. Arranged in the lower portion of the hot air chamber 17 is a water-chamber 19', having a shell 20 closed at the bottom by a plate 21 from one edge of which depends a deflector or apron 29 which serves to insure a better circulation of air within the casing. Extending vertically through this shell are flues 22, and at one side thereof is a water inlet tube 24 and at the opposite side, an outlet tube 25, these two tubes extending through the wall of the casing so that the liquid may freely circulate through the water-chamber. Arranged below the heater is a burner 26 that is mounted on an inclined, laterally extending supply pipe 27 which communicates with a vertical supply pipe 28 leading to an elevated reservoir 30 that is arranged for the reception of gasolene or other hydro-carbon. A removable closure, denoted by the numeral 32, arranged to rest upon the top of the casing, is provided, and this closure, in its turn, is provided with an aperture, in which the vertical supply pipe 28 is slidably and rotatably mounted. The bottom of the casing 10 carries a thrust bearing 31, alined vertically with the aperture in the closure, and adapted to receive, for rotation, the lower extremity of the vertical supply pipe 28. The vertical supply pipe 28 may be rotated in the aperture in the closure, and in the thrust bearing 31, to position the burner, alternately, beneath the water-chamber 19', and beyond the contour thereof, the last mentioned position being indicated in dotted lines in Fig. 1 of the drawings. The upper extremity of the vertical supply pipe 28, which extends upward through the aperture in the closure 32, carries, rigidly assembled therewith, the reservoir 30, hereinbefore mentioned, and this reservoir 30, as clearly seen in Fig. 1, is located relatively near to the upper surface of the closure 32. By this construction, it will be impossible to remove the closure 32 without first grasping the reservoir 30 and rotating the burner from its position beneath the water-chamber 19' to the position as shown in dotted line in Fig. 1. Moreover, since the reservoir 30 is located relatively near to the upper surface of the closure 32, it is impossible to raise the closure 32 without, at the same time, raising the burner. The device is therefore so constructed that, if access is to be had to the burner for lighting the same, the said burner must first be rotated from beneath the water-chamber 19' and then raised upward to a position relatively near to the top of the casing, and adjacent the open air. The advantages incident to this construction are obvious. It not infrequently happens that there is a leakage about the burner, due to the burner being accidentally extinguished, or to other causes. This leakage of the fuel results in the formation of explosive mixtures between the water-chamber 19' and the bottom of the casing, and in the device of our invention it is impossible to light the burner so long as it is disposed in the vapor-laden air existing between the water-chamber 19' and the bottom of the casing.

In operation the products of combustion from the heater will flow through the vertical flues 22 and the temperature of the water within the heater will be gradually raised. This will naturally induce a circulation, the water from the tank flowing through the inlet pipe 24 and outward through the discharge tube 25 until the entire body of liquid has been raised to the desired temperature, after which the heater may be readily removed. Any form of liquid fuel may be employed, or where the device is to be used in a bath room the upper end of the tube 28 may be connected by a flexible pipe to the gas burner and while only a single burner has been shown it is obvious that a cluster of burners may be used where rapid heating is desired.

What is claimed is:—

A device of the class described comprising a casing; an inclined partition disposed within the casing; a water-chamber spaced from the bottom of the casing and peripherally mounted in the partition and in the casing to form therewith, an inclosed chamber within the casing; flues piercing the water-chamber; water inlet and outlet pipes leading from the water-chamber to the exterior of the casing; the casing being provided with an air inlet disposed upon one side of the partition, with an air outlet disposed upon the other side thereof; a removable closure arranged to rest upon the top of the casing and provided with an aperture; a thrust bearing mounted upon the bottom of the casing and vertically alined with the aperture in the closure; a vertical supply pipe slidably mounted in the aperture of the closure and having its lower terminal mounted in the thrust bearing; a laterally extending supply pipe communicating with the vertical pipe; a burner carried by the laterally extending pipe; the vertical pipe being rotatable in the bearing and in the aperture in the closure to position the burner, alternately, beneath the water-chamber and beyond the contour thereof; and a reservoir assembled with the upper terminal of the vertical supply pipe and positioned to limit the upward movement of the closure when the burner is disposed beneath the water chamber.

In testimony that we claim the foregoing as our own, we have hereto affixed our signatures in the presence of two witnesses.

ALVA E. HIGLEY.
ARCHER S. HIGLEY.

Witnesses:
JAMES E. TULLY,
W. H. PURNELL.